J. F. FIELDS.
Saw-Set.

No. 200,040. Patented Feb. 5, 1878.

WITNESSES:
W. W. Hollingsworth
Edw. W. Byrn

INVENTOR:
James F. Fields
BY
ATTORNEYS.

UNITED STATES PATENT OFFICE.

JAMES F. FIELDS, OF GREENEVILLE, TENNESSEE.

IMPROVEMENT IN SAW-SETS.

Specification forming part of Letters Patent No. 200,040, dated February 5, 1878; application filed November 16, 1877.

*To all whom it may concern:*

Be it known that I, JAMES F. FIELDS, of Greeneville, in the county of Greene and State of Tennessee, have invented a new and Improved Saw-Set; and I do hereby declare that the following is a full, clear, and exact description of the same, reference being had to the accompanying drawings, forming part of this specification, in which—

Figure 1:
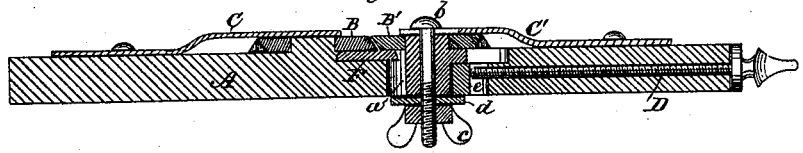
Figure 2:
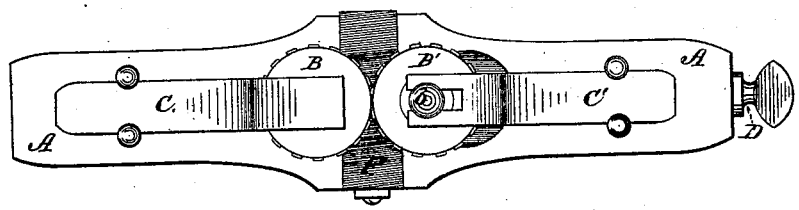
Figure 3:
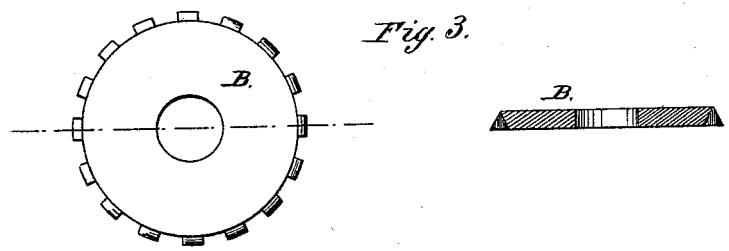
Figure 4:
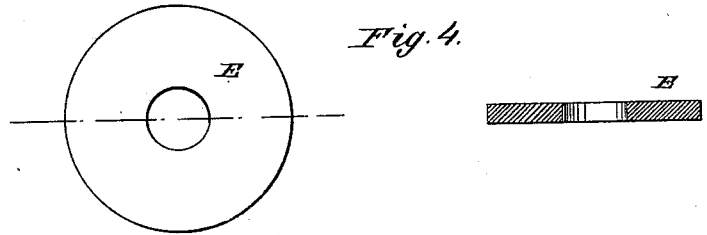

Figure 1 is a longitudinal central section; Fig. 2, a face view; Fig. 3, details of one of the toothed disks; Fig. 4, details of one of the plain disks.

My invention relates to an improved device for setting the teeth of saws in an easy and rapid manner, the same being adapted to set saws of any size of tooth, to remove the irregular set of saw-teeth, and to simultaneously strike off or level the teeth of the saw during either of the above operations.

The invention is an improvement upon that form of saw-set in which two notched disks are arranged in a frame-work to gear with each other, so that when the saw-blade is passed between them a set is given in the opposite direction to the alternate teeth, one disk being adjusted toward the other by means of a movable journal and a set-screw.

The improvements consist in the particular construction and arrangement of the parts of the saw-set, and in the application of a file between the disks, to level the teeth simultaneously with the setting, all as hereinafter fully described.

In the drawings, A represents the frame-piece, which may be made of metal or other suitable material. B B' are the two disks, pivoted upon bearings near the center, and in a plane parallel with the frame-piece. These disks are held upon their journals by the flat clasp-springs C C', but are so detachably arranged that they may be lifted against the tension of the springs until off their journals, when they may be removed. Upon the peripheries of these disks are formed alternating notches and cogs having reversely-inclined faces, and the notches and cogs of one disk are arranged, with respect to the notches and cogs of the other, so as to gear with each other, which causes the inclination of the notch of one disk to be parallel with the inclination of the cog of the other, so that, as the teeth of the saw pass between the two disks, they are set alternately with a reverse inclination.

To tighten the disks upon the saw, or adapt the space between the notches and cogs of the disks to a greater thickness of saw-blade, one of the disks is made adjustable to or from the other by means of a set-screw, D, passing longitudinally through the frame-piece, and having a thumb-piece upon the extremity thereof. In securing this adjustment its journal $a$ is made movable, and the frame-piece and clasp-spring are correspondingly slotted, to accommodate such movement. This movable journal $a$ is fixed and held in place by a screw-bolt, $b$, thumb-nut $c$, and washer $d$, a segmental step, $e$, being arranged upon one side of the journal, to receive the end of the adjusting-screw D and take up the wear.

In using the device, the saw-blade is firmly held by any suitable means, the setting device applied to the teeth and then moved across the same, the set-screw D being adjusted, as desired, to the thickness of the saw-blade.

For different sizes of saw-teeth the setting-disks are removed or replaced by others of a size corresponding to the size of the saw required to be set, the intention being to provide a set of disks with each frame-piece, numbered and gaged to correspond to the number and gage of different saws.

If, before the saw is set, it is necessary to straighten out an irregular set in the teeth, the plain disks E are used in the place of those having teeth.

To simultaneously strike off or level the teeth of a saw while setting or straightening them, a steel-face plate, F, is arranged in the path of the saw flush with the bottom edges of the disks, and is provided with a roughened file-face, which levels the teeth at the same time they are set. This plate F is held in a transverse groove in the frame-piece, and is removably secured by a button, so that when it is not required to level the teeth the opposite plain side of the plate may be placed outward.

Having thus described my invention, what I claim as new is—

1. The removable file F, arranged in the line of the saw and combined with the frame-piece and the revolving disks, for the purpose of leveling the teeth, substantially as described.

2. A saw-set composed of the frame-piece A, revolving disks B B', flat clasp-springs C C', set-screw D, and clamping bolt and nut b c, combined and arranged substantially as shown and described.

3. The combination of the slotted clasp-spring C', the adjustable disk B', the bolt and nut b c, and the frame-piece A, substantially as described.

The above specification of my invention signed by me this 3d day of November, 1877.

JAMES F. FIELDS.

Witnesses:
C. L. SEVIER,
W. C. WILLIS.